United States Patent [19]
Wyman

[11] 3,930,573
[45] Jan. 6, 1976

[54] ACCUMULATING CONVEYOR AND CONTROL MEANS

[75] Inventor: Ronald E. Wyman, North St. Paul, Minn.

[73] Assignee: Wyard Industries, Inc., Forest Lake, Minn.

[22] Filed: Dec. 18, 1974

[21] Appl. No.: 533,514

Related U.S. Application Data

[63] Continuation of Ser. No. 455,993, March 29, 1974, abandoned.

[52] U.S. Cl................ 198/37; 198/127 R; 198/160
[51] Int. Cl.²........................................ B65G 43/08
[58] Field of Search............ 198/34, 37, 127 R, 160; 193/35 SS

[56] References Cited
UNITED STATES PATENTS

2,932,380  4/1960  Alvey et al.................. 198/160 UX
3,066,788  12/1962  Christiansen.................. 198/127 X

*Primary Examiner*—Richard A. Schacher
*Assistant Examiner*—Douglas D. Watts
*Attorney, Agent, or Firm*—John C. Barnes

[57] ABSTRACT

An accumulating conveyor for pallets which maintains the pallets in a predetermined spaced relation along the conveyor. A pallet on the discharge end of the conveyor will cause the subsequent pallets to stop along the conveyor at predetermined intervals. This separation is maintained for the pallets. The drive of the conveying mechanism comprises a single chain and individual spaced wear strips which are each raised to drive the pallet and are controlled by spaced controls engageable with the pallets such that the pallets control the operation of the conveyor drive.

11 Claims, 4 Drawing Figures

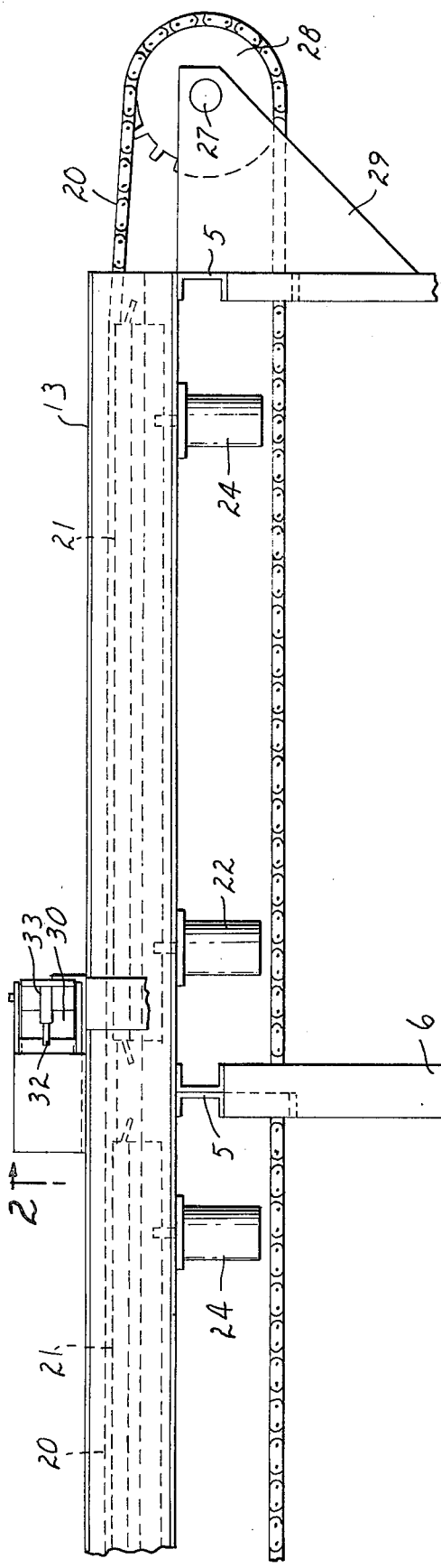
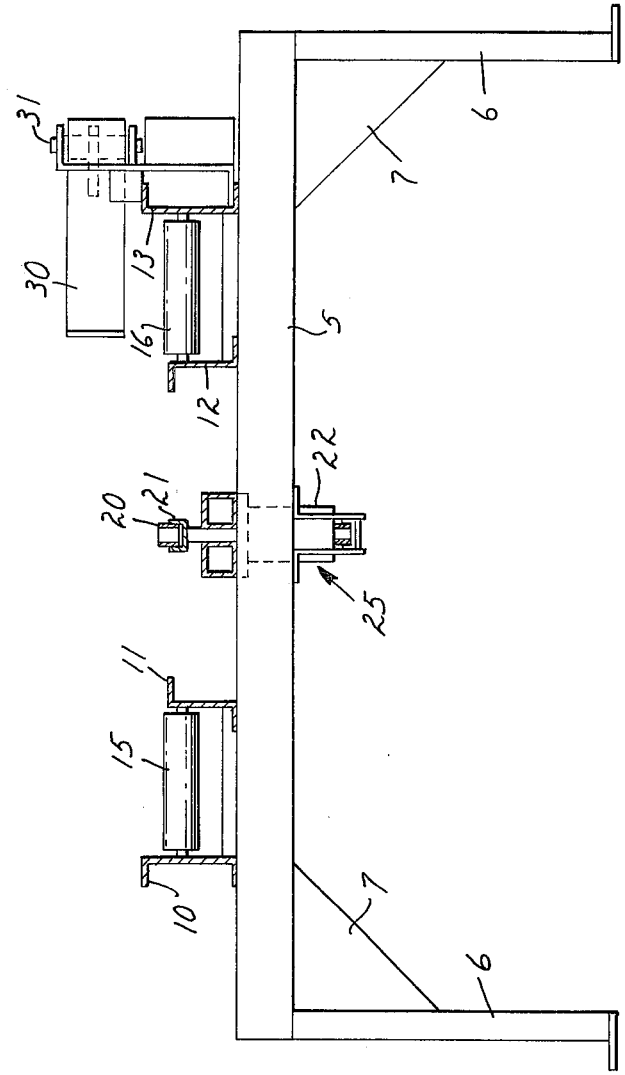
FIG.2
FIG.1
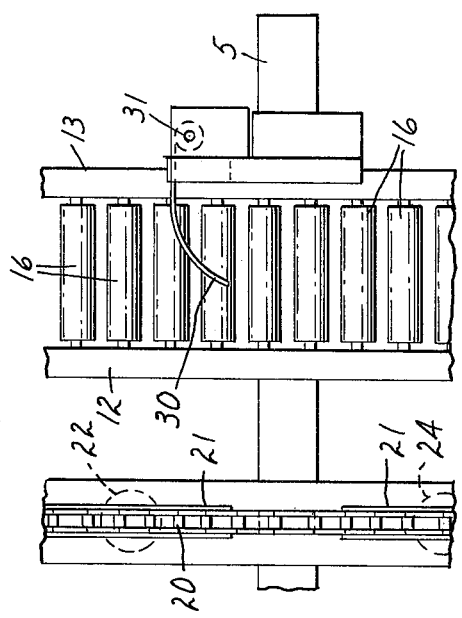
FIG.3

ACCUMULATING CONVEYOR AND CONTROL MEANS

This is a continuation of application Ser. No. 455,993 filed Mar. 29, 1974, now abandoned.

BACKGROUND OF THE INVENTION

1. Field of the Invention

This invention relates to a pallet conveyor, and in one aspect to an improved accumulating conveyor and method of controlling the movement and separation of articles on the conveyor.

2. Description of the Prior Art

Conveyors for pallets wherein the pallets are moved along a plurality of parallel rollers and the pallets are moved by a chain engaging the center of the pallet to pull it along on the rollers is not new per se. U.S. Pat. No. 2,932,380 discloses a conveyor to drive articles from a single chain. The chain is moved vertically to engage the articles on the conveyor and the conveyor will continually crowd the articles such that as a unit is moved off of the conveyor the next item on the conveyor is moved forward to the unloading position and when it is unloaded, the next element is advanced forward to the unloading position. In this prior device with the pallets crowded on the conveyor, the operation of the conveyor requires more power as the chain is constantly frictionally contacting the pallets and the movement of the pallets less orderly than is desirable.

The present invention provides a solution to the prior difficulties encountered in handling the pallets on the accumulating conveyors. An advantage of the present invention is that the conveyor maintains the pallets separated along the conveyor. Further, the present invention provides a control means for the accumulating conveyor such that individual pallets will operate the controls, the drive on a pallet is discontinued when it is stopped and, removal of one pallet from the discharge end of the conveyor serves to energize the driving mechanisms to advance all of the pallets on the conveyor by one step.

SUMMARY OF THE INVENTION

The accumulating conveyor of the present invention comprises means for advancing pallets along a conveyor. Along the conveyor are separately operated members for discontinuing the friction drive to the pallets at predetermined areas along the conveyor, and control means are provided for stopping individual pallets in spaced relation along the conveyor at the predetermined positions of the operating members such that the pallets do not become crowded. The conveyor provides for the orderly advance of the pallets upon discharge of the end pallet off the conveyor. The controls will advance all of the other pallets on the conveyor forward by a single step from their previous position. The conveyor chain is moved through individual channel-shaped wear members which can be raised to lift the chain into frictional driving engagement with a pallet. The wear members or conveyor operators are raised by motors joined in a fluid circuit, preferably air, such that all of the operators are initially in an operating position and a pallet on the conveyor will move the length thereof, will be sensed by the series of sensing members operating successive valve mechanisms but failing to discontinue the operation of any of the operators until the end valve mechanism has been operated. The end sensing member then stops the first pallet by lowering the conveyor operator discontinuing the drive to the pallet thereabove. This operator is now disconnected from the power line and the operator function is discontinued. A line in the fluid circuit is now open and the subsequent operation of the second sensing member from the end will cause it to drop its associated conveyor operator, stopping a pallet at the second position. This action is progressive on down the line until all of the operators have been tripped because of the existence of pallets at each of the positions along the conveyor or until the first pallet on the discharge end has been removed. Removal of the pallet at the discharge end is afforded by an additional valve member to be operated under the control of an operator or a sensing member for temporarily overriding the position of the sensing member to actuate the pallet drive operator. This will later result in the operation of all of the drive members as they are now all energized.

BRIEF DESCRIPTION OF THE DRAWING

The above advantages and novel features of the present invention and a better understanding of the operation of the invention will be had after a careful reading of the following detailed description which refers to the accompanying drawing wherein:

FIG. 1 is a fragmentary side elevational view of the conveyor constructed according to the present invention showing one operator and a portion of another;

FIG. 2 is a transverse sectional view of the conveyor of FIG. 1 taken along lines 2—2 of FIG. 1;

FIG. 3 is a fragmentary plan view of the conveyor showing a control member; and

DETAILED DESCRIPTION OF THE PREFERRED EMBODIMENT

Figure 4:
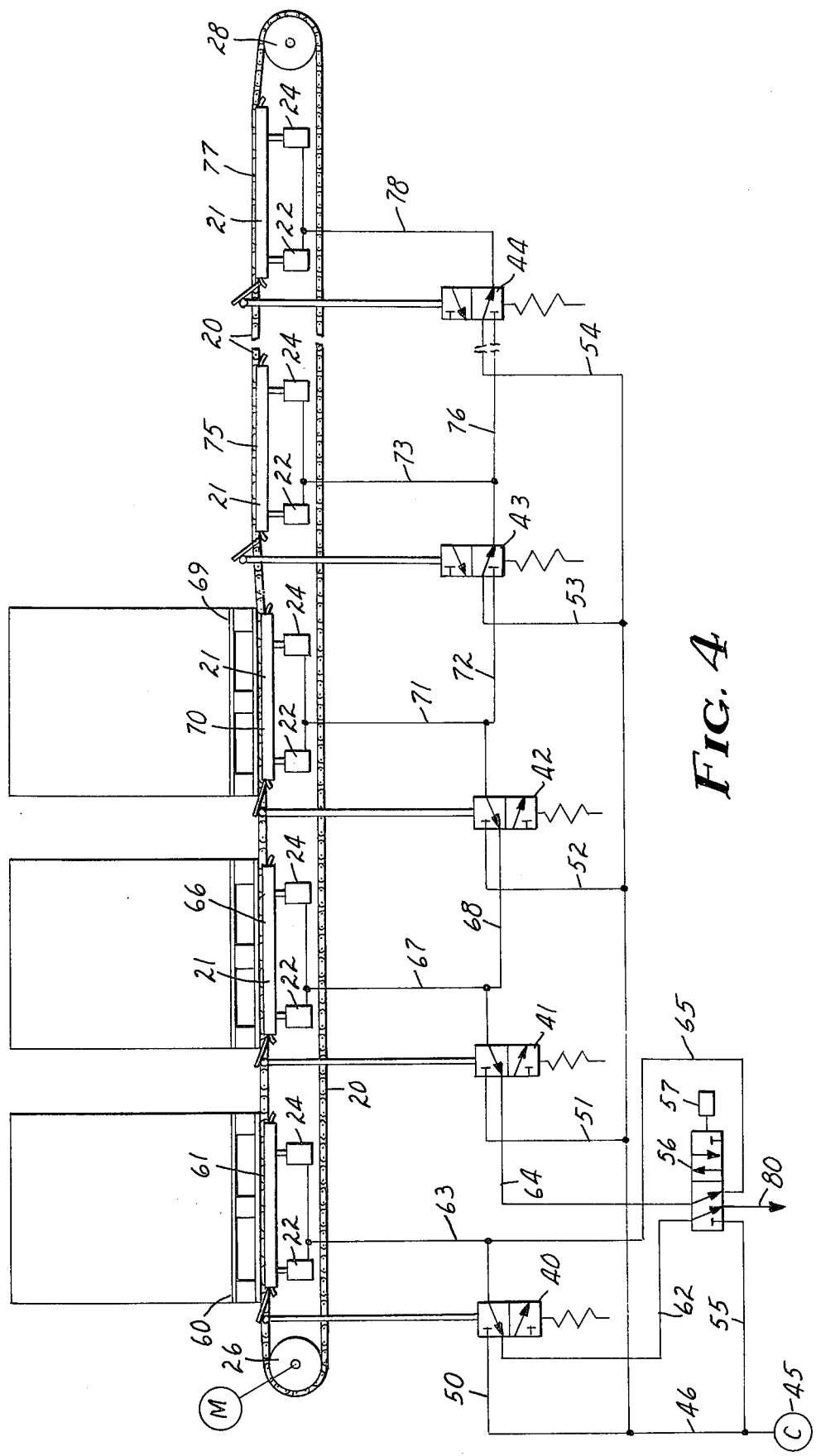
FIG. 4 is a schematic diagram of the conveyor and the control means.

The conveyor of the present invention is adapted for accumulating and spacing pallets or pallet loads. The conveyor comprises a frame which is generally rectangular including spaced cross members 5 supported from posts 6 at each end thereof and connected by gusset plates 7. Support members for carrying pallets or the like extend longitudinally of the frame. Positioned between the transverse members 5 are spaced frame members 10, 11, 12 and 13. The frame members 10 and 11 comprise supports for one roller set along which the pallet moves, which set comprises a plurality of rollers 15, and the frame members 12 and 13 support a second roller set comprising a plurality of rollers 16. The rollers in each roller set are separately journalled on parallel axis along a straight conveyor stretch, and the rollers are spaced to engage the pallets along their respective opposed bottom edges or skids. Positioned between the frame members 11 and 12 is a frame for supporting an endless roller chain 20 which serves to propel the pallets along the roller sets. The endless chain 20 is supported along the upper stretch of its path by a plurality of spaced channel members 21, each channel 21 being in spaced position to define a position for a pallet spaced from the others as the same are accumulated on the conveyor.

The channels 21 are supported for vertical reciprocation on spaced fluid operated reciprocating piston-cylinder motors 22 and 24, which cylinders are supported in a fixed position by a frame 25 which is rigidly supported between the transverse frame members 5 and between the frame members 11 and 12.

Energization of the cylinders 22 and 24 beneath each of the channels 21 causes the same to lift the channel 21 and chain 20 such that the chain 20 would engage the bottom surface of a pallet positioned on the rollers 15 and 16 of the respective roller sets. As the cylinder is charged with fluid the drive rod thereof lifts the channel 21 and drive chain 20 to engage the pallet advancing it along the rollers.

The endless chain 20 is suitably driven by a drive wheel 26 at one end of the conveyor, driven from motor M as illustrated in FIG. 3, and an idle sprocket 28 supports the chain 20 at the load end. The drive wheel 26 and idle sprocket are suitably journalled on axes 27 supported in brackets 29.

Adjacent the trailing end of each channel 21 is a control member of the control circuit. The control member illustrated in FIGS. 1 and 2 comprises a wide sensing arm 30 formed of sheet material extending across the path of a pallet moving along the conveyor set 16. The arm 30 is mounted on a rotatable shaft 31 which shaft is baised by spring means to maintain the arm 30 over the path of the conveyor to be engaged by the pallets moving therealong. Connected to the arm 30 is a cam or actuating slide arm 32 of a valve member 33, which is a three-way valve member of the sliding type. Engagement of the arm 30 by a pallet moving along the rollers 15 and 16 under the driving force of the chain 20 operates the slide arm 32 of the valve 33, and as the pallet passes, the sensing arm 30 returns to its initial position and the valve operator 32 returns to its initial position.

Referring now to FIG. 4 there is shown in schematic form the single endless conveyor chain 20 and a plurality of, preferably 4 ft. long channels 21 supported on the cylinders 22 and 24. The discharge end of the conveyor is located to the left of FIG. 4. Each of the channels 21 has a sensing member including the sensing arm 30 positioned adjacent the trailing end of the channel. These operators or sensing arms drive respectively valves 40, 41, 42, 43, 44 etc. as illustrated in the drawing.

The control circuit for the conveyor comprises a compressor 45 which places fluid under pressure, i.e. preferably compressed air, into a line 46 connected by branch lines 50, 51, 52, 53, and 54 to each of the valves 40, 41, 42, 43 and 44 respectively. From the line 46 is also connected a branch line 55 directed to a valve 56 which is interposed in the circuit to bypass the control valve 40 and affords operation of the cylinders 22 and 24 of the end control unit or channel 61 to move or discharge the end pallet from the conveyor as desired. Valve 56 is operated by a motor 57, such as a solenoid, controlled by a push button or by an electric eye or other automatic sensing device. In the position shown in FIG. 4 the valve 56 is blocking the pressure of the fluid in the branch line 55 and is positioned to exhaust fluid from the cylinders 22 and 24, through the line 63 leading to the control valve 40 and an exhaust line 62, which is connected to the control valve 40 and to the valve 56. Valve 40 is moved from a normal charging position to the sensing or exhaust position illustrated upon operation of the arm 30 by a pallet 60 positioned on the operator channel 61. The line 63 is also connected by a line 65 to the valve 56 which line 65, through the valve 56, is connected to the cylinders 22 and 24 of the operator channel 66 by the lines 67 and 68. The line 68 is connected to the valve 42 controlled by an arm 30 which has been engaged by a pallet 69 setting on the operator channel 70. The cylinders 22 and 24 for positioning the channel 70 are connected by the line 71 to a branch line 72 connecting valve 42 and valve 43. Valve 43 is connected through line 76 to the cylinders 22 and 24 for operating channel 75 by a branch line 73 and line 76 is connected to the valve 44 which is positioned to control the channel 77 at the load end of the conveyor through a branch line 78.

Movement of the valves 41 through 44 to their exhaust positions prior to the movement of the valve 40 to the exhaust position, exhausting fluid from the cylinders 22 and 24 supporting channel 61, produces no change in the position of the respective channels 66, 70, 75, or 77 since they are connected to the power line 46 through line 50, 63 and 65. Upon movement of the valve 40 to the exhaust position the valves 41 through 44 will successively move to the exhaust position terminating the operation of their respective operating mechanisms 66, 70, 75, and 77 in succession to stop the pallets positioned thereabove when valve 56 is in the normal rest position shown in FIG. 4. The motors 22 and 24 for the channels 66, 70, 75 and 77 will exhaust through the preceding valve as well as the valve associated therewith, through line 64, valve 56, line 65, valve 40, line 62 and out through an exhaust port in valve 56 connected to an exhaust line 80.

To activate the conveyor under pallet 60 by raising the chain 20 into frictional engagement therewith, a switch must be operated to energize the solenoid 57 and move the valve 56 to its alternate or active position. In this position valve 56 connects the branch line 55 to exhaust line 62, and to line 63 to charge the motors 22 and 24. The bypass line 65 is blocked at valve 56, and line 64 through which the other motors exhaust their pressure is connected directly to exhaust line 80. When pallet 60 clears the sensor controlling valve 40, valve 40 shifts and it is connected to branch line 50 to charge the cylinders 22 and 24 through line 63 and to charge line 65. A further electric eye or sensing switch, or again an operator, will open the electric circuit to the solenoid 57 and valve 56 will return to its rest position. Since valve 40 is positioned to connect line 65 to a source of fluid pressure, i.e. line 50, the valve 56 will connect line 65 to line 64 and all cylinders 22 and 24, previously connected to the exhaust line 80 will be charged and pallets on the conveyor will be advanced from the load end until valve 40 again shifts to exhaust its cylinders 22 and 24.

Having thus described the present invention with reference to a preferred embodiment thereof, it will be appreciated that minor changes may be made without departing from the spirit of the invention as set forth in the appended claims.

What is claimed is:

1. An accumulating conveyor comprising
   support members defining a conveyor stretch along which material may be moved, said conveyor stretch having a load end and a discharge end,
   drive means for moving material along said support members,
   operator means positioned along said conveyor stretch for positioning said drive means in position to engage said material including operator means at the discharge end of said conveyor,
   control means for said operator means for positioning said operator means in an operative position to drive said material along said conveyor until material is positioned over said operator means at said discharge end of said conveyor and for moving said operator means successively to an inoperative position as material is moved thereover stopping material and filling the conveyor from the discharge end toward the load end.

2. A conveyor according to claim 1 wherein said drive means comprises an endless member and said operator means comprises a wear member for supporting said endless member for vertical movement and guiding it along said conveyor stretch and fluid motors for moving said wear members vertically.

3. A conveyor according to claim 1 wherein said operator means comprise a length of material for supporting said drive means and motor means for positioning said length of material and said drive means at different vertical positions, and said control means comprise a plurality of spaced operator valves operated by material moving along said conveyor stretch, each operator valve having a normal position connecting said motor means to pressurized fluid and a sensing position connecting said motor means of a said operator means to the motor means of the preceding operator means.

4. A conveyor according to claim 3 wherein said operator means at the discharge end of the conveyor has its operator valve movable to connect its said motor means to a fluid pressure source or to an exhaust line and a bypass valve intermediate said operator valve and said exhaust line for connecting said motor means to a pressure line operating said motor means on command to move material therefrom.

5. A conveyor according to claim 4 wherein said operator valves are two-way valves to connect all motor means to said exhaust line when said operator valves are all in said sensing position and separately to a pressure fluid line when in their normal position.

6. A conveyor according to claim 3 wherein said length of material is a channel-shaped wear member extending along said conveyor stretch, said drive means is an endless chain riding in the channel-shaped wear member, and said motor means are fluid cylinders to raise and lower each said wear member to lift said chain into frictional contact with material on said support members.

7. A conveyor according to claim 3 wherein said operator valves are operated by a pivoted sensing arm positioned in the path of material moving along said conveyor stretch.

8. A conveyor according to claim 4 wherein said control means includes means to connect all motor means previously connected to said exhaust line to pressurized fluid when said operator means at the discharge end of the conveyor has its operator valve in said normal position whereby all material on said conveyor spaced from said discharge end will be advanced simultaneously when material is removed from said discharge end.

9. A conveyor according to claim 1 wherein said drive means comprises an endless member moved along the conveyor stretch, said operator means comprise a plurality of spaced wear members for supporting said endless member and fluid motors for moving said wear members from said inoperative position with said endless member in a position spaced from contact with said material to said operative position with said endless member moved to a position engaging said material to be moved, and said control means includes means for simultaneously charging all said fluid motors of said operator means in said inoperative position upon movement of material from said discharge end whereby all material on said conveyor will be simultaneously advanced toward said discharge end rapidly affording space at said load end.

10. An accumulating conveyor for pallets or containers which will maintain the pallets or containers thereon in spaced positions along its length, said conveyor comprising roller support members extending along a path to support pallets and define a conveyor stretch having a loading and discharge end, an endless chain extending along said path and supported at each end of said path for engaging a pallet on said support members, means for driving said chain along said path, support members spaced along said chain between the ends of said path for supporting said chain along said path, said support members being spaced less than the length of a pallet or container to be moved along the conveyor stretch, motor means supporting said support members to move the same vertically to raise and lower said chain supported thereby into and out of engagement with the pallets or containers, a source of fluid pressure, a valve associated with each said support member and associated motor means, said valve being connected to said source of fluid pressure, connected to adjacent valves, and to said associated motor means by a branch line connected to said line connecting adjacent valves, a sensing arm, positioned to be engaged by a pallet or container moving along said conveyor stretch, connected to each said valve for moving said valve from a normal position connecting said associated motor means to said source of fluid pressure to a sensing position to exhaust said associated motor means and lower said support member, and control valve means for sequentially exhausting pressure from each said valve associated with each support member upon the valve at the discharge end of the conveyor stretch being moved to a sensing position whereby the support members sequentially lower the chain from contact with a pallet or container upon operation of the valves sequentially from the discharge end toward the loading end after a pallet or container actuates the valve at the discharge end.

11. An accumulating conveyor according to claim 10 wherein said control valve means includes means for simultaneously connecting said motor means previously connected to be exhausted to said source of fluid pressure upon said valve at the discharge end of the conveyor stretch being returned to a normal position from said sensing position whereby the pallets on said conveyor stretch will simultaneously move toward the discharge end of said conveyor upon a pallet being removed therefrom.

* * * * *